United States Patent
O'Connor et al.

(10) Patent No.: US 8,574,460 B2
(45) Date of Patent: Nov. 5, 2013

(54) PROCESSING OF BIOMASS-DERIVED OXYGENATES WITH PARTICLES COMPRISING A COKE DEPOSIT

(75) Inventors: Paul O'Connor, Hoevelaken (NL); Avelino Corma Camos, Valencia (ES); George W. Huber, Massachusetts, MA (US)

(73) Assignee: KiOR, Inc., Pasadena, TX (US)

( * ) Notice: Subject to any disclaimer, the term of this patent is extended or adjusted under 35 U.S.C. 154(b) by 0 days.

(21) Appl. No.: 13/196,543

(22) Filed: Aug. 2, 2011

(65) Prior Publication Data

US 2013/0048915 A1 Feb. 28, 2013

Related U.S. Application Data

(63) Continuation of application No. 12/373,731, filed as application No. PCT/EP2007/057257 on Jul. 13, 2007.

(30) Foreign Application Priority Data

Jul. 14, 2006 (EP) .................... 06117210

(51) Int. Cl.
 C10G 11/00 (2006.01)
 C01B 3/02 (2006.01)
(52) U.S. Cl.
 USPC .......... 252/373; 48/197 R; 208/113; 208/121; 208/122; 208/123; 208/124
(58) Field of Classification Search
 USPC ............... 423/648.1, 651; 208/113, 121, 122, 208/123, 124; 252/373; 48/197 R
 See application file for complete search history.

(56) References Cited

U.S. PATENT DOCUMENTS

| | | | |
|---|---|---|---|
| 4,207,167 A | 6/1980 | Bradshaw | |
| 4,409,416 A | 10/1983 | Snell et al. | |
| 4,450,241 A | 5/1984 | Hettinger | |
| 5,196,633 A * | 3/1993 | Kresge et al. | 585/469 |
| 5,362,380 A | 11/1994 | Hsing et al. | |
| 5,651,953 A | 7/1997 | Yokoyama et al. | |
| 2005/0209093 A1* | 9/2005 | Chester et al. | 502/65 |
| 2007/0007176 A1* | 1/2007 | Pinho et al. | 208/108 |
| 2009/0026112 A1* | 1/2009 | Dierickx et al. | 208/119 |

FOREIGN PATENT DOCUMENTS

| | | |
|---|---|---|
| GB | 2310865 | 9/1997 |
| JP | 8059202 | 3/1996 |
| JP | 9255303 | 9/1997 |
| JP | 2002292247 | 10/2002 |
| WO | 03045841 | 6/2003 |

OTHER PUBLICATIONS

Wang et al. "Catalytic steam reforming of biomass-derived oxygenates: acetic acid and hydroxyacetaldehyde" 2996, 143 245-270.*

(Continued)

*Primary Examiner* — Wayne Langel
*Assistant Examiner* — Syed Iqbal
(74) *Attorney, Agent, or Firm* — Hovey Williams LLP

(57) ABSTRACT

A method is disclosed for producing a mixture of CO and $H_2$ (syn-gas). The method comprises contacting particles containing a coke deposit with oxygenated molecules derived from biomass. In a preferred embodiment the particles are catalyst particles.
The method may be carried out in the regenerator of a conventional fluid catalyst cracking (FCC) unit.

23 Claims, 6 Drawing Sheets

(56) References Cited

OTHER PUBLICATIONS

Fatsiko et al., "Production of Hydrogen for Fuel Cells by Reformation of Biomass-derived Ethanol", Catalysis Today, vol. 75, 2002, pp. 145-155.

Bridgewater AV: "Catalysis in Thermal Biomass Conversion", Applied Catalysis A: General, Elsevier Science, Amsterdam, NL, vol. 116, pp. 5-47, 1994.

Office Action dated Sep. 21, 2012 of co-pending U.S. Appl. No. 12/373,731, filed on Nov. 4, 2009.

Yuan et al: "The Influence of FCC Catalyst with Different Coke Deposition on the Reaction Mechanism of Olefins in Gasoline", 2004, Prepr. Pap. Am. Chem. Soc. Div. Fuel Chem. 49(2) pp. 565-567.

Wang et al: "Catalytic Steam Reforming of Biomass-derived Oxygenates: Acetic Acid Hydroxyacetaldehyde", 1996, 143, pp. 245-270.

Czernik et al.: "Hydrogen by Catalytic Steam Reforming of Liquid Byproducts from Biomass Thermoconversion Processes", 2002, Ing. Eng. Chem. Tes. 41, pp. 4209-4215.

Courson et al.: "Development of Ni Catalysts for Gas Production from Biomass Gasification. Reactivity in Steam and Dry- Reforming", 2000, 63, pp. 427-437.

\* cited by examiner

PROCESSING OF BIOMASS-DERIVED OXYGENATES WITH PARTICLES COMPRISING A COKE DEPOSIT

This is a continuation of application Ser. No. 12/373,731, filed Nov. 4, 2009, which is based on PCT International Application PCT/EP2007/057257, filed Jul. 13, 2007 which claims priority from European Patent Application No. 06117210.2 filed Jul. 14, 2006, the entirety of each of the foregoing applications is hereby incorporated herein by reference.

BACKGROUND OF THE INVENTION

1. Field of the Invention

This invention relates to a process for production of syngas (hydrogen, carbon monoxide) by feeding biomass and biomass-derived molecules (including sugars, Starches, cellulose, hemicelluloses, lignin, glycerol, and triglycerides) with water or $CO_2$ into the regenerator of a fluid catalytic cracking (FCC) unit.

The European Commission has set a goal that by 2010, 5.75% of transportation fuels in the EU will be biofuels. Blending biofuels with petroleum based fuels will reduce dependence on imported crude oil, reduce emissions of greenhouse gases, and improve agricultural economies.

2. Background Art

Methods for conversion of solid biomass into liquids by acid hydrolysis, pyrolysis, and liquefaction are well known (Klass 1988). A wide range of products are produced from the above reactions including: cellulose, hemicelluloses, lignin, polysaccharides, monosaccharides (e.g. glucose, xylose, galatose), furfural, polysaccharides, and lignin derived alcohols (coumaryl, coniferyl and sinapyl alcohols). Bio-oils, which are a mixture of over 300 different compounds, can also be produced by liquefaction of fast pyrolysis (Elliott, Beckman et al. 1991).

Fluid catalytic cracking (FCC) is the most widely used process for the conversion of crude oil into gasoline and other hydrocarbons. The FCC process consists of two vessels coupled together as shown in FIG. 1. In the first reactor a hot particulate catalyst is contacted with hydrocarbon feedstocks in a riser reactor to crack the feedstock, thereby producing cracked products and spent coked catalyst. After the cracking reaction takes place the catalyst is largely deactivated by coke, the coked catalyst is separated from the cracked products, stripped of residual oil by a series of baffles in a downflow reactor by stream stripping, and then regenerated by burning the coke from the coked catalyst in a regenerator. The regeneration process occurs at 650-760° C. and a pressure around 3 atm to burn off coke. The hot catalyst is then recycled to the riser reactor for additional cracking.

A variety of process configurations and catalysts have been developed for the FCC process. FCC catalysts usually contain mixtures of a Y-zeolite within a silica-alumina matrix although other compositions are also known to those skilled in the art. Using FCC processes for biomass conversion does not require a significant capital investment as FCC plants are already installed in petroleum refineries. It would therefore represent a considerable advance in the state of the art if efficient methods were developed to use the FCC process to convert biomass-derived molecules into fuels and chemicals.

Several methods have been reported for conversion of biomass-derived molecules into liquid fuels using zeolite catalyst. Chen and Koenig in U.S. Pat. No. 4,933,283 and U.S. Pat. No. 4,549,031 (Mobil) report a process for conversion of biomass derived carbohydrates, starches and furfural into liquid hydrocarbon products, CO and coke by passing aqueous streams over zeolite catalyst at 500° C. (Chen, T. F. Degrian et al. 1986; Chen and Koenig 1990). They observed that 40-66% of the carbon converts to coke when xylose, glucose, starch and sucrose are fed over a ZSM-5 catalyst at 500° C. (Chen, T. F. Degnan et al. 1986). Other products formed included hydrocarbons, CO and $CO_2$. They also report that mixing the aqueous-carbohydrate streams with methanol leads to lower levels of coke and higher levels of hydrocarbons.

Bio-oils, produced by fast pyrolysis or liquefaction from biomass, are a mixture of more than 300 compounds. Bio-oils are thermally unstable, and need to be upgraded if they are to be used as fuels. Bio-oils, and bio-oil components, can be converted into more stable fuels using zeolite catalysts (Bridgwater 1994). Reaction conditions used for the above process are temperatures from 350-500° C., atmospheric pressure and gas hourly space velocities of around 2. The products from this reaction include hydrocarbons (aromatic, aliphatic), water soluble organics, water, oil soluble organics, gases ($CO_2$, CO, light alkanes), and coke. During this process a number of reactions occur, including dehydration, cracking, polymerization, deoxygenation, and aromatization. However poor hydrocarbon yields and high yields of coke generally occur under reaction conditions, limiting the usefulness of zeolite upgrading.

Bakhshi and co-workers studied zeolite upgrading of wood derived fast-pyrolysis bio-oils and observed that between 30-4- wt % of the bio-oil formed coke or char, (Sharma and Bakhshi 1993; Katikaneni, Adjaye et al. 1995; Adjaye, Katikaneni et al. 1996. ZSM-5 catalyst produced the highest amount (34 wt % of feed) of liquid organic products of any catalyst tested. The products in the organic carbon were mostly aromatics for ZSM-5, and aliphatics for $SiO_2$—$Al_2O_3$. Gaseous products included $CO_2$, CO, light alkanes, and light olefins. Bio-oils are thermally unstable and thermal cracking reactions occur during zeolite upgrading. Bakhshi and co-workers also developed a two reactor process, where only thermal reactions occur in the first empty reactor, and catalytic reactions occur in the second reactor that contains the catalyst. (Srinivas, Dalai et al. 2000) The advantage of the two reactor system is that it improves catalyst life by reducing the amount of cake deposited on the catalyst.

The transformation of model bio-oil compounds, including alcohols, phenols, aldehydes, ketones, acids, and mixtures, have been studied over HZSM-5 catalysts. (Gayubo, Aguayo et al. 2004; Gayubo, Aguayo et al. 2004; Gayubo, Aguayo et al., 2005) Alcohols were converted into olefins at temperatures around 200° C., then to higher olefins at 250° C., followed by paraffins and a small proportion of aromatics at 350° C. (Gayubo, Aguayo et al. 2004) Phenol has a low reactivity on HZSM-5 and only produces small amounts of propylene and butanes. 2-Methoxyphenol also has a low reactivity to hydrocarbons and thermally decomposes generating coke. Acetaldehyde had a low reactivity to ZSM-6 catalysts, and it also underwent thermal decomposition leading to coking problems (Gayubo, Aguayo et al. 2004). Acetone, which is less reactive than alcohols, converts into C5+ olefins at temperatures above 350° C. These olefins are then converted into C5+ paraffins, aromatics and light alkenes. Acetic acid is first converted to acetone, and that then reacts as above. Products from zeolite upgrading of acetic acid and acetone give considerably more coke than products from alcohol feedstocks. The majority of biomass derived molecules produce large amount of coke when passed over acidic zeolite catalysts. It would therefore represent a considerable advance in the state of the art if efficient methods for conversion of biomass derived coke into premium products were developed When petroleum feedstocks contain levels of Conradson carbon greater than 6.0 wt5, special modifications are required in the FCC regenerator. In the 1980's Hettinger et al. from Ashland Oil published two patents on an FCC process for conversion of petroleum feedstocks with high levels of Conradson carbon (greater than 6.0 wt %) (Hettinger, Kovach et al. 1984; Hettinger, Kovach et al. 1984; Hettinger 1999). These feedstocks lead to high carbon levels and the temperature in the regenerator would rise to above 850° C. if high levels of carbon were present on the FCC catalyst. If the temperature in the regenerator is above 850° C. a rapid loss of catalytic activity and selectivity occurs due to loss of zeolite structure. To overcome these problems they proposed to reform some of the coke with $CO_2$ in the catalyst regenerator. The $CO_2$ reacted with the coke to form CO and $H_2O$. They envisioned that this process could be used to also reduce the large amounts of $CO_2$ emitted during the FCC process (Hettinger 1999). They proposed a two stage regenerator system, where $CO_2$ would be used in a first stage to remove most of the hydrogen on the coke, and some carbon, and with possibly a second regenerator which would release enough heat for the cracking reaction. The $CO_2$ from the second step would be recycled to the first stage. Hettinger et al. claimed that this process can be used to recycle feeds with Conradson carbon values up to 20 wt %.

In the patent they state that $CO_2$ reforming could be done at temperatures from 715-800° C. The $CO_2$ reforming reaction is endothermic, which decreases the temperature in the regenerator. In the patent they claim that the $CO_2$ reforming ability of the catalyst can be improved by addition, at a range from 0.5-5 wt %, of the following metals, oxides or salts: Li, Na, K, Sr, V, Ta, Mo, Re, Fe, Co, Ni, Ru, Rh, Pd, Os, hr. Pt, Cu Ag, Au, Sn and Bi. To test the ability of different additives for $CO_2$ reforming, they added the above metals at a 1 wt % level to a zeolite catalyst. They then coked the catalyst to a 1.1 wt % level, passed $CO_2$ over the coked catalyst at 746° C. for 20 min and measured the coke levels. They then grouped the metals according to high activity (45-60% coke conversion), intermediate activity (30-35% coke conversion) and low activity (10-25% coke conversion). The catalysts with high activity included Li~Na>Re~Fe~Co~Ni~Ru~Rh~Pd~Os~Ir~Pt>Cu~Ag~Au~Sr. The Catalysts with intermediate activity included: V>Sn~Bi~Mo. The metal catalysts with the lowest activity included: Ti~Zr~Hf~Cr~W~Actinide Series>K~Rb~Cs~Mg~Ca~Ba~Sc~Y~La~Mn~Zn~Cd~Hg~B~Ga~In~Lanthanide Series>As~Sb~Se~Te. Equilibrium FCC catalysts, in which metals were deposited during the FCC process, were also tested and had a high activity in $CO_2$ reforming.

Steam reforming has also been reported as a method of regenerating coked FCC catalysts. The first mention in the patent literature for steam reforming of coke in an FCC reactor to produce syn-gas appears in 1050 as U.S. Pat. No. 2,518,775 assigned to Phillips Petroleum (Guyer 1950). The experimental section of this patent contains two experiments where a coked FCC catalyst was regenerated at 650° C. with air or with a steam/oxygen mixture. The outlet gas from the catalyst regenerated with air contained primarily $N_2$, $CO_2$, CO and $O_2$. The outlet gas from the catalyst regenerated with the steam-oxygen mixture contained 38% $CO_2$, 30% CO and 33% $H_2$ (% in volume). This patent then recommends that the syn-gas be used to produce alkanes by Fischer-Tropsch Synthesis. The authors recommended that catalyst regeneration be done at the highest temperature permissible without causing permanent catalyst deactivation. They recommended a temperature range of 540-980° C. and a regeneration gas of 10-80 vol. % oxygen and 90-20 vol. % steam. This is a steam to oxygen ratio between 9:1 to 1:4.

In the 1980s several more patents appeared in the literature for steam ramming of carbon in an FCC catalytic regenerator. Ralph W. Bradshaw from Phillips Petroleum patented a process to produce syn-gas in an FCC regenerator by adding steam to an air or oxygen stream that was fed into an FCC regenerator (Bradshaw 1980). This syn-gas was then sent to a water-gas shift reactor to generate hydrogen to be used for hydrocracking and other process operations. No experimental results were presented in this patent.

Another patent, assigned to Exxon, was written by Grenoble and Weissman in the early 80's (Grenoble and Weissman 1981). They tested catalyst consisting of oxides of tungsten or niobium combined with tantalum, hafnium, chromium, titanium and zirconium supported on $Al_2O_3$. They tested the catalytic activity for CC in a fixed bed-reactor, and claim two different ways of catalytic regeneration: (1) partial combustion to produce a low BTU gas rich in CO and (2) steam addition to produce a gas rich in $H_2$. The patent did not contain any experiments with regard to syn-gas production from coke. The goal of this patent was to reform feedstocks that contained high amounts of Conradson carbon, which leads to high coke levels on the catalyst surface. The inventors' approach was to develop novel materials that maintained their structures under high temperature steam treatments. In this patent they claim to have developed novel FCC catalysts that were stable at temperatures up to 760-1500° C., where traditional FCC catalysts suffer due to irreversible deactivation.

Another more recent patent written in 1994 by Hsing and Mudra from Texaco discussed ways to convert the carbon on an FCC catalyst to a gaseous mixture of $CO_2$, CC), $CH_4$, and $H_2$ by steam reforming (Hsing and Mudra 1994). They report reaction conditions of temperatures from 540-650° C., steam to carbon molar ratios of 0.5-20 and reaction times from 0.5 to 30 minutes. They report that 10-40% of the carbon can be removed by these steam treatments. The remaining carbon is removed from the catalyst by a 2nd regeneration treatment with air. In a fluid catalytic pilot plant steam was injected into the steam stripper in the absence of oxygen at temperatures from 590-650° C. The off gas contained large amounts of $H_2$ (32-50 vol %), $CO_2$ (10-19%) as well as CO, $CH_4$ and $H_2S$. Removal of part of the carbon in the steam stripper reduced the temperature in the regenerator.

Although several processes have been suggested for converting coke deposits on FCC catalysts to syn-gas type compositions, no attempts have been reported to provide an external carbon source to FCC regeneration processes. In particular, the prior art contains no suggestion that an oxygen-rich carbon source, such as derived from biomass, may be used for this purpose.

BRIEF SUMMARY OF THE INVENTION

This invention relates to a process for production of a gaseous mixture of CO and $H_2$ comprising the step of contacting particles containing coke deposits with biomass derived oxygenates. Biomass-derived oxygenates include: cellulose, hemicelluloses, lignin, polysaccharides, monosaccharides (e.g. glucose, xylose, galatose), and molecules derived from the above listed molecules. Mixtures of these compounds, such as those found in bio-oils derived from pyrolysis or liquefaction, are also included in the biomass-derived oxygenates definition.

The particles are preferably catalyst particles.

The method may be carried out in a traditional fluid catalytic cracking (FCC) reactor.

The catalysts in the FCC reactor and regenerator can include traditional FCC catalysts consisting of zeolite and zeolite mixtures or modified FCC catalysts. These modified catalysts include traditional FCC catalysts where metals or metal oxides in the range of 0.01 to 10 wt % are added.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
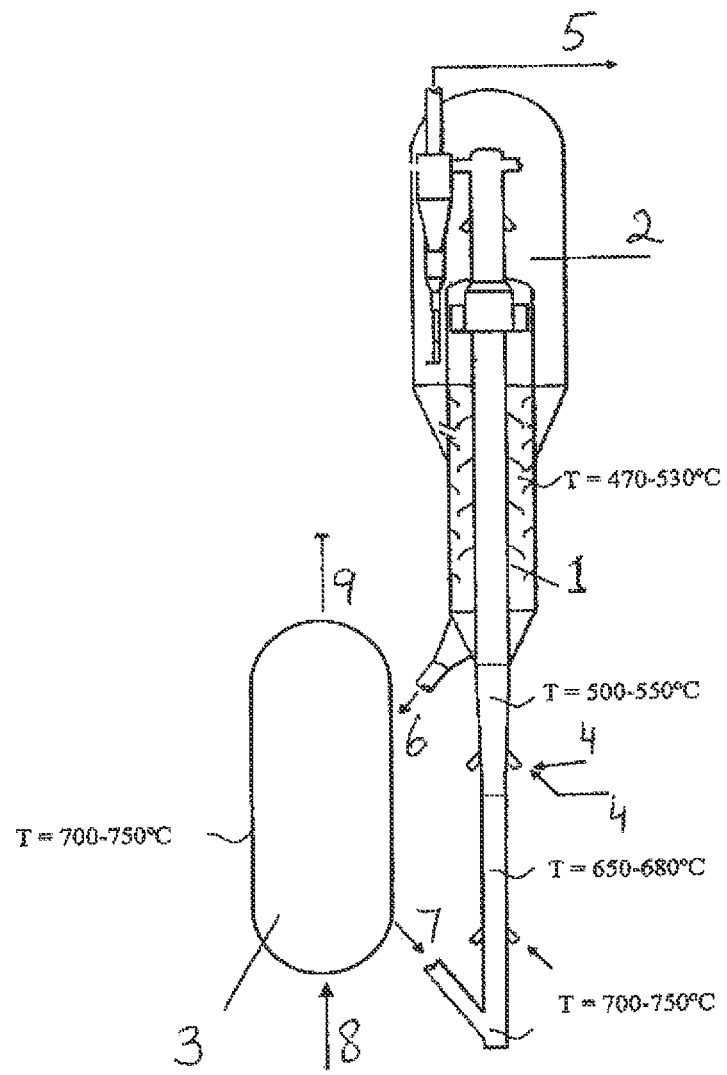
FIG. 1 is a flow diagram of a typical FCC process. A typical FCC unit comprises a riser reactor 1, a stripper 2, and a regenerator 3. A hydrocarbon feedstock, such as vacuum gas oil (VGO) is introduces at 4. Cracked hydrocarbon products leave the stripper at 5. Spent catalyst leaves the riser 1 at 6, and recycled back into the reactor at 7. Air is introduced into the regenerator at 8; $CO_2$ and nitrogen leaves the regenerator at 9.

The present invention is a method for production of syngas ($H_2$, CO) by feeding biomass-derived oxygenates with water or $CO_2$ into a reactor containing particles having a coke deposit.

The particles may be inert particles, such as sand particles and the like. In a preferred embodiment the particles have catalytic activity, for example particles of alumina, silica, silica-alumina, clay, hydrotalcite, or zeolite. In a still further preferred embodiment the particles are catalyst particles as used in a fluid catalytic cracking (FCC) process of an oil refinery.

Biomass-derived oxygenates include: cellulose, hemicelluloses, lignin, polysaccharides, monosaccharides (e.g. glucose, xylose, galactose), furfural, polysaccharides, lignin derived alcohols (coumaryl, coniferyl and sinapyl alcohols), and molecules derived from the above listed molecules. Mixtures of these compounds, such as those found in bio-oils derived from fast pyrolysis or liquefaction, are also included in the biomass-derived oxygenate definition.

In one embodiment the method comprises a two-step reaction sequence. In the first step biomass, or a primary biomass derivative such as bio-oil, is subjected to mild catalytic cracking. The term "mild catalytic cracking" refers to the use of a catalyst having a relatively modest cracking activity as compared to traditional cracking catalysts as are used in oil refineries. Suitable catalytic materials include clay, or a refractory oxide such as silica, alumina, zirconia, and the like. Zeolites are also suitable, provided they contain significantly fewer acidic sites than the zeolites typically used in traditional fluid catalytic cracking ("FCC") reactors. In general, zeolites having a SAR of more than 10 are preferred for use in this first step of the reaction sequence. More preferred are zeolites having a SAR of more than 15. Particularly preferred is ZSM-5, which has a SAR of more than 20. It may be advantageous to tailor the catalytic activity of the catalyst particles by admixing or incorporating from 0.001 to 10 wt % of a metal or metal compound, as described in more detail herein below in the context of the use of modified FCC catalyst.

In one embodiment the metal is selected from the group consisting of nickel, palladium, platinum, ruthenium, rhodium, iridium, cobalt, iron, osmium, and mixtures thereof. In an alternate embodiment the metal is selected from the group consisting of Li, Na, K, Sr, V, Ta, mo, Re, Fe, Co, Ni, Sn, and Bi and mixtures thereof. Preferred are metals selected from the group consisting of Group IIB metals, Group VIIb metals, and mixtures thereof.

The metal may be added to the catalyst prior to the step of contacting the catalyst particles containing coke deposits with the biomass derived oxygenated molecules, or it may be added during this step.

During this mild cracking reaction the biomass or primary biomass derivative is converted to liquid and gaseous products of a lower molecular weight than the feed. At the same time char and coke are deposited onto the catalyst particles.

In the second step coke and char deposits on the catalyst particles are converted to syn gas by reaction with biomass-derived oxygenates with water and/or $CO_2$. This second step is carried out as described in more detail herein below in the context of FCC regeneration.

In an alternate embodiment the method is integrated with traditional FCC cracking of mineral oil fractions. As discussed hereinabove, the traditional FCC process comprises, as a first step, the actual catalytic cracking reaction, during which coke is deposited onto the FCC catalyst particles. After cracking products are stripped off the catalyst particles, the catalyst is regenerated by burning off the coke deposits. In this particular embodiment of the present invention the traditional FCC regeneration step is replaced with the step of forming a syn gas by contacting the coke deposit-containing FCC catalyst particles with biomass-derived oxygenates and water and/or $CO_2$.

The catalysts in the FCC reactor and regenerator may include traditional FCC catalysts consisting of zeolite and zeolite mixtures or modified FCC catalysts. These modified catalysts include traditional FCC catalysts where metals or metal oxides in the range of 0.01 to 10 wt % could be added to traditional FCC catalysts. The metal or metal oxides could be added before and/or during reaction in the forms of oxides, salts or organometallic compounds. The elements that can be added to the FCC catalysts compromise a metal or metal oxide selected from the transition metals including Sc, Ti, V, Cr, Mn, Fe, Co, Ni, Cu, Zn, Y, Zr, Nb Mo, Tc, Ru, Rh, Pd, Ag, Ce, W, Re, Ox, Ir, Pt, Au, Group IB metals and Group IIB metals metal oxides or mixtures of these compounds with transition metal may be added to the FCC catalyst.

In addition to, or instead of; adding metal components to the catalyst particles, it may also be desirable to provide an additive for adjusting the $CO/CO_2$ and $H_2/CO$ ratios of the gaseous mixture being produced. Suitable additives include supported Ni catalyst particles.

During biomass-addition, with $H_2O$ or $CO_2$ to a FCC regenerator several reactions may be occurring including:

biomass decomposition to syn-gas, coke formation, coke steam reforming, coke $CO_2$ reforming, and water-gas shift. Herein we use ethylene glycol to represent a biomass-derived oxygenate. Ethylene glycol can decompose into syn-gas (Equation. 1) or into carbon and water (Equation 2). Carbon dioxide reforming or the Boudouard reaction involves reaction of coke with $CO_2$ to form CO as shown in Equation 3. Steam reforming of the coke involves reaction of the coke with water to produce CO and $H_2$ as shown in Equation 4. Two other reactions that may also be involved in this process are the water gas-shift reaction (WGS) and methanation shown below as Equations 5 and 6 respectively. The coke may also contain some hydrogen. We therefore report benzene (a model for hydrogenated coke) steam and $CO_2$ reforming as Equations 7 and 8 respectively.

$$C_2O_2H_6 \rightarrow 2CO+3H_2 \quad (1)$$

$$C_2O_2H_6 \rightarrow 2C+3H_2O \quad (2)$$

$$C+CO_2 \rightarrow 2CO \quad (3)$$

$$C+H_2O \rightarrow CO+H_2 \quad (4)$$

$$CO+H_2O \rightarrow CO_2+H_2 \quad (5)$$

$$CO+3H_2 \rightarrow CH_4+H_2O \quad (6)$$

$$C_6H_6+6H_2O \rightarrow 6CO+9H_2 \quad (7)$$

$$C_6H_6+6CO_2 \rightarrow 12CO+3H_2 \quad (8)$$

Figure 2:
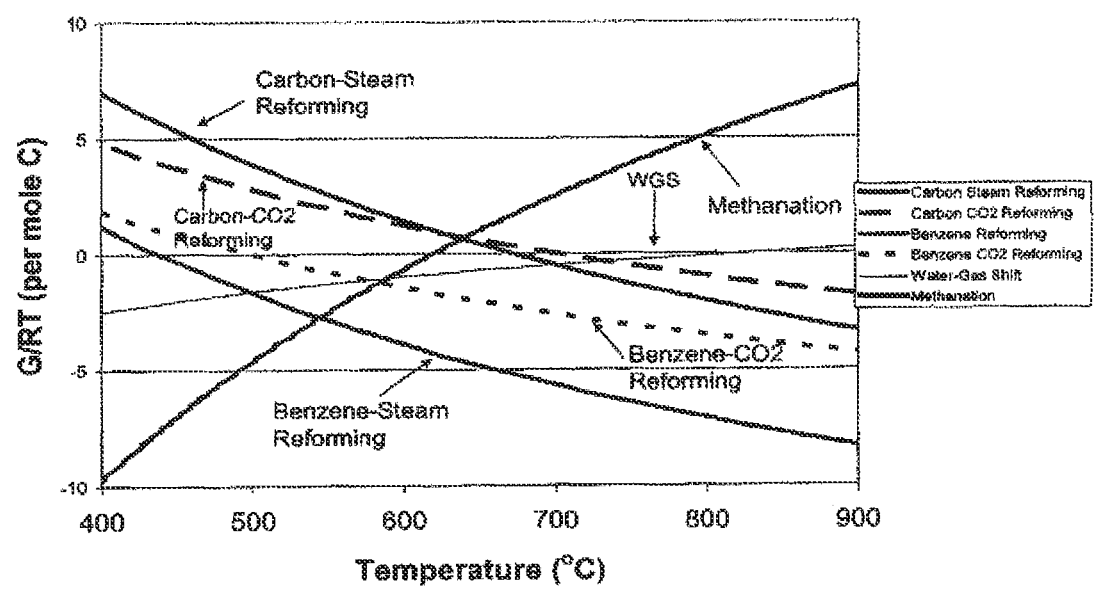
FIG. 2 represents the thermodynamics for reactions involving steam and $CO_2$ reforming of biomass-derived compounds.
Figure 3:
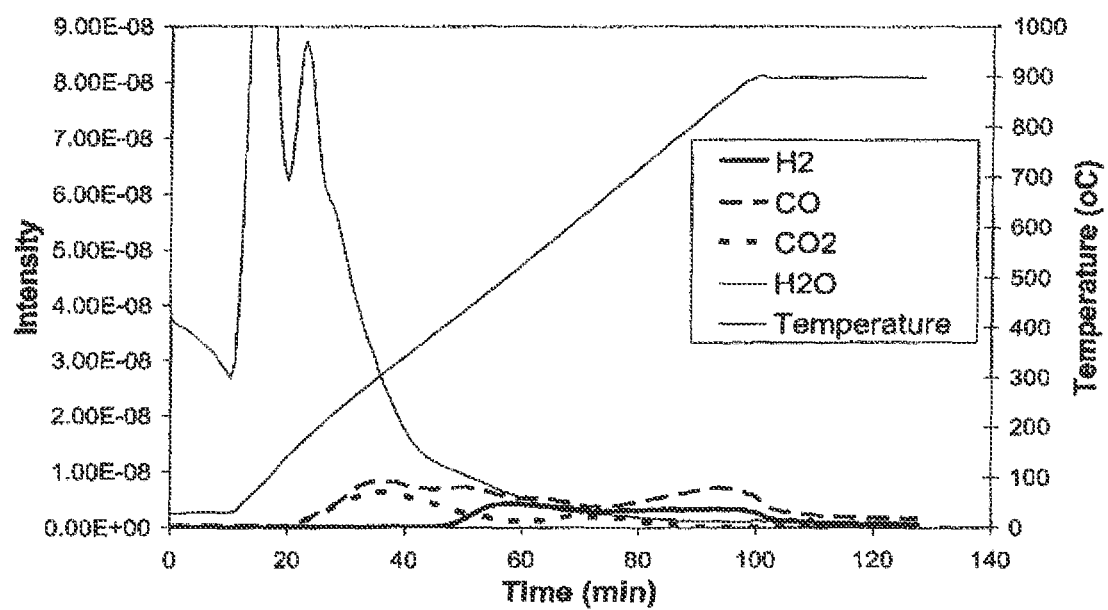
FIG. 3 shows a temperature programmed reaction of He with 2 wt % Ni/FCC1 catalyst impregnated with aqueous glucose solution.

The thermodynamics of Equation 1 and 2 are such that both are thermodynamically favorable at temperatures from 200-900° C. with a standard gibbs free energy (GIRT) of less than −10 kJ/mole of carbon, this indicates that syn-gas and coke can indeed be produced from ethylene glycol (and also glucose) at these conditions. FIG. 2 shows the standard gibbs free energy for $CO_2$ reforming of carbon (Equation 3), $H_2O$ reforming of carbon (Equation 4), water-gas shift reaction (Equation 5) and methanation (Equation 6). Since the coke may contain hydrogen we have included $H_2O$ and $CO_2$ reforming of benzene (shown in Equations 7 and 8 respectively) in this figure. All values in FIG. 3 are normalized per mole of carbon. As shown in FIG. 3 $H_2O$ and $CO_2$ reforming of carbon is thermodynamically favorable at temperatures above 700° C. Reforming of benzene is thermodynamically favorable at temperatures above 450 and 500° C. for $H_2O$ and $CO_2$ reforming respectively. All of the $CO_2$ and $H_2O$ reforming reactions are endothermic and increasing the reaction temperature increases the gibbs free energy.

The water-gas shift and methanation reactions are exothermic and increasing reaction temperature decreases the gibbs free energy. The water-gas shift reaction is thermodynamically favorable at temperatures below 800°. If the goal is hydrogen production, additional lower temperature water-gas shift reactors will be required to convert CO to $H_2$. The methanation reaction is thermodynamically favored at temperatures lower than 600° C., therefore $C_4$ levels will be low at temperatures above 700° C. These thermodynamic calculations show that it is indeed possible to produce syn-gas by feeding biomass into a FCC regenerator, in the presence of $H_2O$.

The biomass-derived oxygenated molecules may be contacted with the particles containing coke deposits in the form of, for example, aqueous solutions or in the form of solid particles. If the oxygenated molecules are in the liquid form (for example, bio-oil) they may be contacted with the particles in the form of droplets of liquid.

The oxygenated molecules may be derived from the biomass in a process involving little or no chemical conversion, or in a process involving extensive chemical conversion. In the former case the oxygenated molecules may comprise cellulose or a cellulose derivative; hemicelluloses or a hemicelluloses derivative; and/or lignin or a lignin-derived product. Oil rich biomass comprises oxygenated molecules in the form of triglycerides or triglyceride-derived products.

In the latter case the oxygenated molecules may be the product of a process such as fast pyrolysis or liquefaction, thermal or hydrothermal conversion, catalytic conversion, enzymatic conversion, and the like. Examples of such molecules include polysaccharides, derivatives of polysaccharides, monosaccharides (in particular glucose, xylose, fructose, galactose, and mixtures thereof), glycerol and alkyl esters of glycerol, and the like.

In a specific embodiment the oxygenated molecules comprise dehydration products of carbohydrates, such as furfural, 5-hydroxymethylfurfural, or levulinic acid.

Depending of the desired composition of the syn-gas produced in the method of the present invention, steam and/or $CO_2$ may be injected during the step of contacting the catalyst particles containing coke deposits with the oxygenated molecules.

The method may be carried out in a reactor having at least two regions, a first region and a second region, with different reaction conditions in each region. Advantageously, the first region may have a high steam level, a high $CO_2$ level, and a low oxygen level, and the second region may have a low steam level, a low $CO_2$ level, and a high oxygen level. The terms "high" and "low" in this context are relative terms, comparing the conditions in the first region with those of the second region.

The following Examples are included solely to provide a more complete disclosure of the subject invention. Thus, the following examples serve to illustrate the nature of the invention, but do not limit the scope of the invention disclosed and claimed herein in any fashion.

Example 1

A commercial FCC catalyst (FCC1), containing Y-zeolite in a silica-alumina matrix with no metal content, was laboratory-deactivated during 5 hours at 816° C. under a steam-vapor atmosphere. The FCC1 had a silica to alumina ration (SAR) of 13, and a BET surface area of 290 m²/g. A 2 wt % Ni/FCC1 catalysts was prepared by incipient wetness impregnation of an aqueous solution of Ni-nitrate hydrate onto the FCC1 surface. The preparation procedure involved the following steps; (1) dissolving Ni-nitrate hydrate (Aldrich Chemicals) in an aqueous solution, (2) drop-wise addition of Ni-nitrate solution onto FCC1, and (3) calcinations of the resulting material at 500° C. in air fix-3 h.

Example 2

Temperature programmed experiments were performed to verify if syn-gas could be produced from biomass on FCC catalysts. For these experiments aqueous solutions of glucose (30 wt % glucose) were impregnated onto catalysts with a weight ratio of 0.75 gm solution to 1.00 gm catalyst prior to the experiments. 300 mg of the glucose-catalyst mixture was then heated in flowing He or He saturated with $H_2O$ in a Micrometrics AutoChem 2910 temperature programmed desorption systems. Products were analyzed by mass spectroscopy (Balzers instrument Omnistar with Faraday and Channeltron detector) and the major products observed were $H_2$, CO, $CO_2$ and $H_2O$. Catalysts and reactants were ramped in flowing gas from room temperature to 900° C. at a rate of 10° C./min and held at 900° C. for 30 minutes. After reaction the carbon content of the remaining catalyst was analyzed with an elemental analyzer (EA1108 CHNS-0 Fisons Instruments). Three catalysts were tested including FCC1 (described in Example 1), 2 wt % Ni/FCC1 (described in example 1), and a commercial Ni steam reforming catalyst (Haldor Topsoe, R-67-7H). FIG. 3 shown the results for temperature programmed experiments when only He is used as the gas and the catalyst at temperatures from 400-900° C. Thirty six percent of the carbon was removed from the catalyst s gas-phase products during this experiment.

Figure 4:
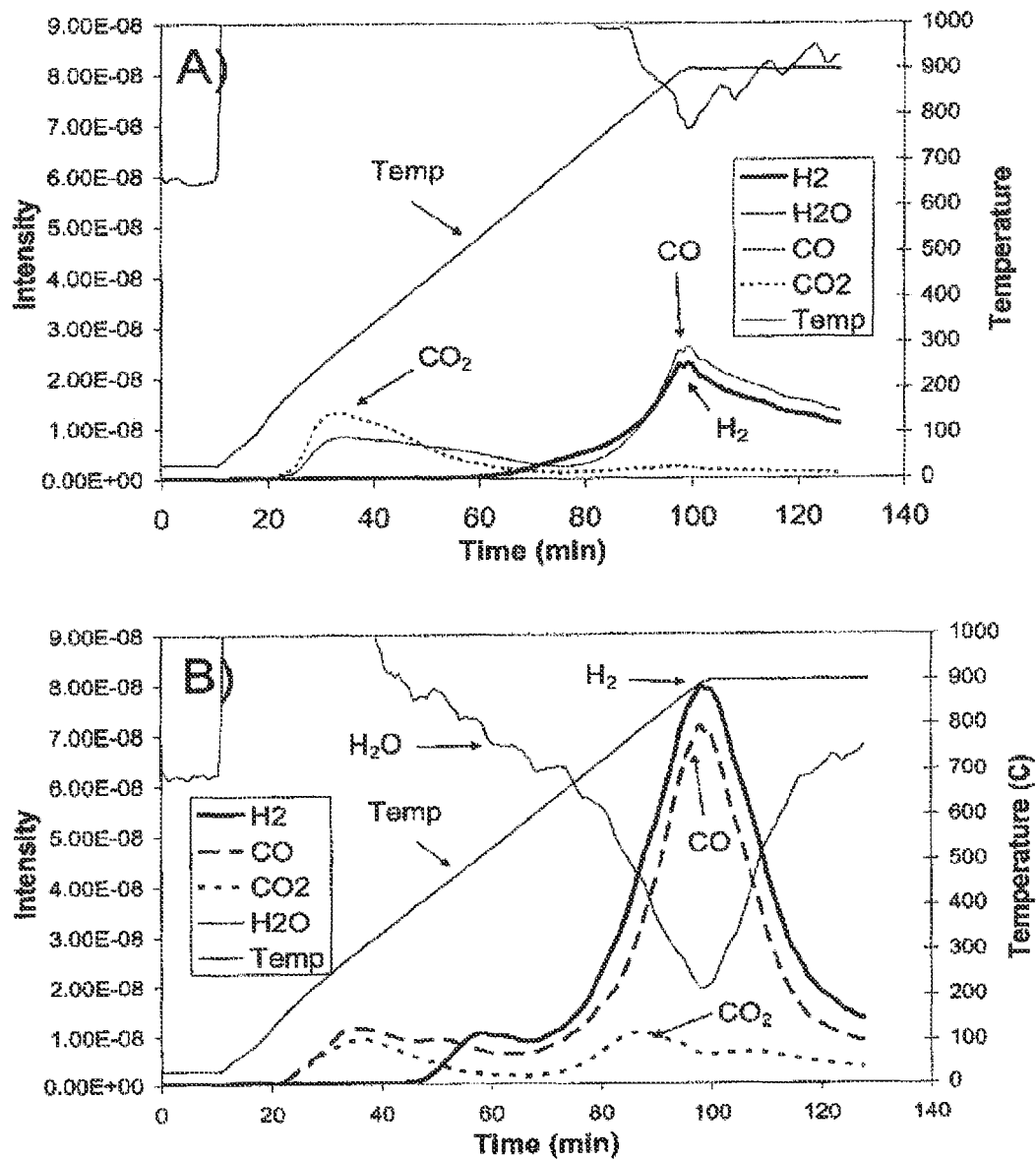
FIG. 4 shows a temperature. Programmed reaction of He saturated with water with FCC catalysts impregnated with aqueous glucose solution. Graph A is a steamed commercial FCC catalyst (FCC1). Graph B is a 2 wt % Ni/Fcc1 catalyst.
Figure 5:
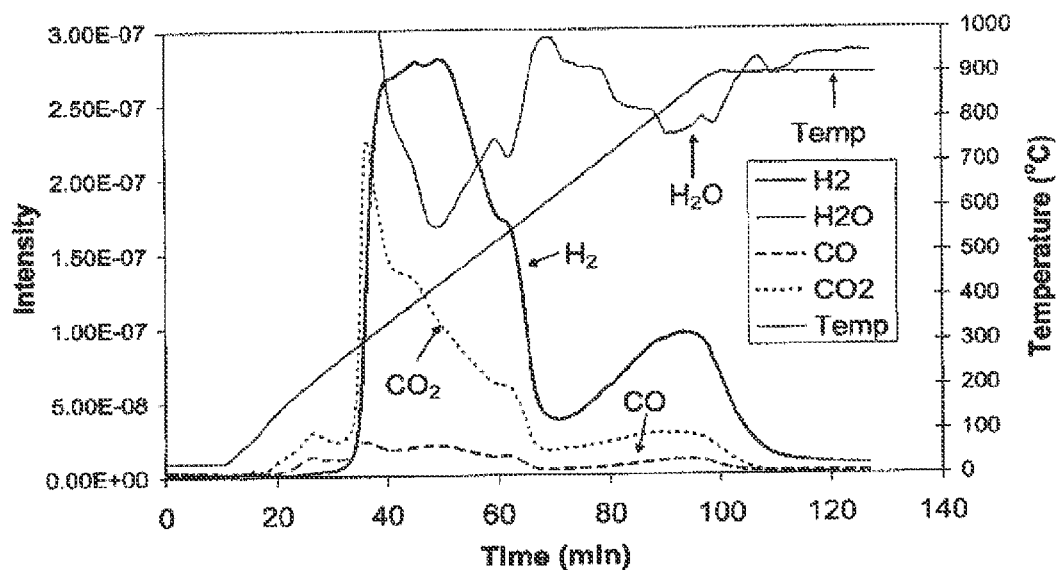
FIG. 5 shows a temperature programmed reaction of He saturated with water with aqueous glucose solution impregnated on a commercial Ni steam reforming catalyst (Haldor Topsoe R-67-7H).

FIG. 4 shows the temperature programmed experiments when the He gas is saturated with water for the FCC1 and Ni/FCC1 catalyst. Large peaks for $H_2$, and CO are observed at temperature of 400-900° C. water consumption is also observed in this temperature range including methane and ethylene. Small amounts of hydrocarbons are observed in this process. The $H_2$ and CO peaks are significantly higher for the Ni containing catalyst indicating that Ni, as for instance Ni deposited on the catalyst during FCC operation, promotes this reaction. This peak is not observed in FIG. 5 when $H_2O$ is not added to the feed. These experiments show that syn-gas can be produced from biomass-derived compounds (glucose) using a standard FCC catalyst and a modified FCC catalyst.

Example 3

Figure 6:
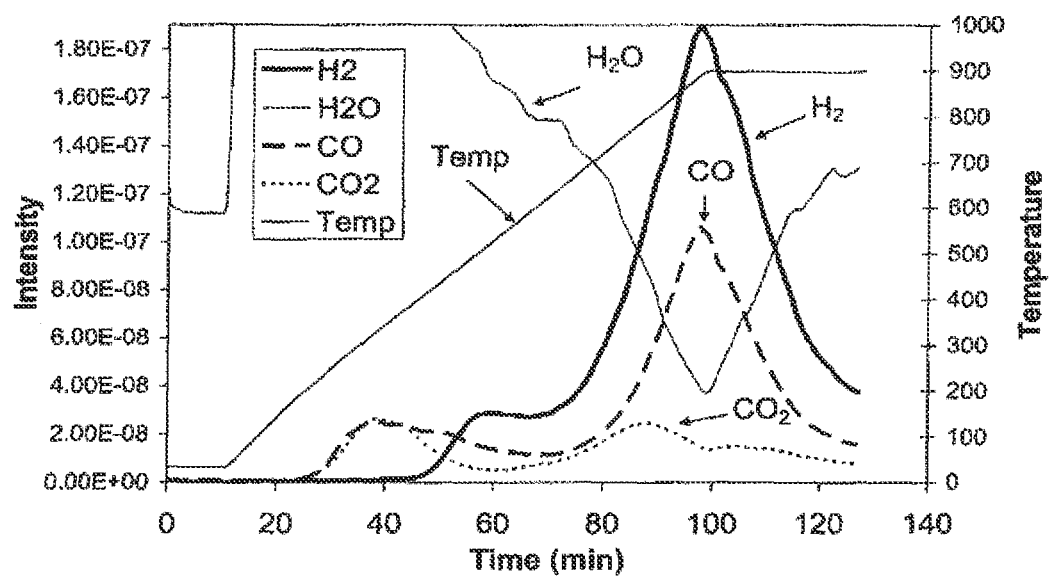
FIG. 6 shows a temperature programmed reaction of He saturated with water with a physical mixture of glucose and 2 wt % Ni/FCC1 (Physical mixture is 21 wt % glucose and 79 wt % catalyst.).

FIG. 6 is a temperature programmed experiment of He saturated with water on a commercial Ni steam reforming catalyst (Haldor Topsoe, R-67-7H) impregnated with a glucose solution using the method described in Example 2. For this catalyst, $H_2$ is produced at temperature above 300° C. Low levels of CO are observed indicating that this catalyst has higher water-gas shift activity. A $H_2$ peak at 600-900° C. is also observed for this catalyst. During this experiment 99.5% of the carbon was converted to gas-phase products (mainly CO and $CO_2$).

Example 4

Temperature programmed experiments were done with a physical mixture of 21 wt % glucose and 79 wt % of 2 wt % Ni/FCC1 (described in Example 1) with He saturated with water as shown in FIG. 6. The temperature programming in this example is the same as reported in Example 2. During this experiment 81% of the carbon was converted to gas-phase products. Hydrogen, CO and $CO_2$ were the main gas-phase products in this reaction, and water was consumed.

REFERENCES CITED

Adjaye, J. D., S. P. R. Katikaneni, et al. (1996). "Catalytic conversion of a bio-fuel to hydrocarbons: effect of mixtures of HZSM-5 and silica-alumina catalysts on product distribution." Fuel Processing Technology 48: 115-143

Bradshaw, R. W. (1980). Combination Hydrocarbon Cracking, Hydrogen Production and Hydrocracking. U.S. Pat. No. 4,207,167, USA, Phillips Petroleum Company.

Bridgwater, A. V. (1994). "Catalysis in thermal biomass conversion." Appl. Catal. A 116: 5-47.

Chen, N. Y. (1976). Conversion of Carbohydrate Materials to Petroleum Type Hydrocarbons. U.S. Pat. No. 3,936,353. USA, Mobil Oil Corporation.

Chen, N. Y. and L. R. Koenig (1990). Process for Converting Cellulosic Materials to Hydrocarbon Products. U.S. Pat. No. 4,933,283. USA, Mobil Oil Corporation, Chen, N.Y., J. T. F. Degnan, et al. (1986). "Liquid fuel from carbohydrates." Chemtech 16: 506-11.

Corma, A., F. Melo, et al. (1990), WO90/12317, Vinci Technologies.

Elliott, D. C., D. Beckman, et al. (1991). "Developments in Direct Thermochemical Liquefaction of Biomass: 1983-1990." Energy and Fuels 5: 399-410.

Gayubo, A. G., A. T. Aguayo, et al. (2004), "Transformation of Oxygenate Components of Biomass Pyrolysis on a HZSM-5 Zeolite 1. Alcohols and Phenols." Ind. Eng. Chem. Res. 43: 2610-2618

Gayubo, A. G., A. T. Aguayo, et al. (2004). "Transformation of Oxygenate Components of Biomass Pyrolysis Oil on a HZSM-5 Zeolite. II. Adlehydes, Ketones, and Acids." Ind. Eng. Chem. Red. 43: 2619-2626.

Gayubo, A. G., A. T. Aguayo, et al. (2005). "Undesired components in the transformation of biomass pyrolysis oil into hydrocarbons on an HZSM-5 zeolite catalyst." Journal of Chemical Technology and Biotechnology 80: 1244-1251, Grenoble, D. C. and W. Weissman (1981). Catalytic Cracking Process with Simultaneous Production of a Low BTU Fuel Gas and Catalyst Regeneration. U.S. Pat. No. 4,244,811. USA, Exxon Research and Engineering Corporation, Guyer, J. A. (1950). Combined Hydrocarbon Conversion-Hydrocarbon Synthesis Process. U.S. Pat. No. 2,518,775. USA, Phillips Petroleum Company.

Hettinger, W. P. (1999). "Catalysis challenges in fluid catalytic cracking: a 49 year person account of past and more recent contributions and some possible new and future directions for even further improvements." Catalysis Today 53: 367-384.

Hettinger, W. P., S. M. Kovach, et al. (1984). Endothermic Removal of Coke Deposited on Catalytic Materials during Carbo-Metallic Oil Conversion. U.S. Pat. No. 4,450,241. USA, Ashland Oil.

Hettinger, W. P., S. M. Kovach, et al. (1984). Endothermic Removal of Coke Deposited on Catalytic Materials during Carbo-Metallic Oil Conversion, U.S. Pat. No. 4,425,259. USA, Ashland Oil.

Hsing, H.- H. and J. Mudra (1994). Fluid Catalytic Cracking Process Yielding Hydrogen. U.S. Pat. No. 5,362,380, USA, Texaco.

Katikaneni, S. P. R., J. D. Adjaye, et al. (1995). "Performance of Aluminophosphate Molecular Sieve Catalysts for the Production of Hydrocarbons from Wood-Derived and Vegetable Oils," Energy and Fuels 9: 1065-4078.

Klass, D. L. (1998). Biomass for renewable energy, fuels and chemicals. San Diego, Academic Press.

Shama, R. K. and N. N. Bakhshi (1993). "Catalytic Upgrading of Pyrolysis Oil." Energy and Fuels 7: 306-314.

Srinivas, S. T., A. K. Dalai, et al. (2000). "Thermal and Catalytic Upgrading of a Biomass-Derived Oil in a Duel Reaction System." Canadian Journal of Chemical Engineering 78: 343-354.

What is claimed is:

1. A process for converting biomass to reaction products, comprising:
(a) contacting biomass with an inorganic material having catalytic properties, wherein said biomass comprises cellulose, hemicellulose, or lignin, wherein the inorganic material includes zeolite Y or ZSM-5, (b) converting the biomass to reaction products in the presence of the inorganic material, wherein the reaction products have a lower molecular weight than the biomass, wherein during at least a portion of step (b) coke is deposited onto at least a portion of said inorganic material thereby producing a coked inorganic material, wherein step (b) is carried out in a reactor vessel; and (c) providing at least a portion of said coked inorganic material and at least a portion of said reaction products to a regenerator vessel, wherein during at least a portion of step (c) at least a portion of said coke is removed from said coked inorganic material.

2. The process of claim 1, wherein the biomass includes lignin.

3. The process of claim 1, wherein the inorganic material includes ZSM-5.

4. The process of claim 1, wherein the inorganic material includes zeolite-Y.

5. The process of claim 1, wherein the inorganic material further includes a metal or metal compound.

6. The process of claim 5, wherein the metal or metal compound includes Sc, Ti, V, Cr, Mn, Fe, Co, Ni, Cu, Zn, Y, Zr, Nb, Mo, Tc, Ru, Rh, Pd, Ag, Ce, W, Re, Ox, Ir, Pt, Au, Group IB metals, Group IIB metals, or mixtures thereof.

7. The process of claim 6, wherein the metal or metal compound includes Zn.

8. The process of claim 6, wherein the metal or metal compound includes Ce.

9. The process of claim 5, wherein the metal or metal compound is present in the inorganic material in an amount ranging from 0.01% to 10% by weight relative to the total weight of the inorganic material.

10. The process of claim 1, wherein the inorganic material includes a mixture of ZSM-5 and Zn.

11. The process of claim 1, wherein the inorganic material includes a mixture of ZSM-5 and Ce.

12. The process of claim 1, wherein the inorganic material includes a mixture of ZSM-5, Zn and Ce.

13. The process of claim 1, wherein step (c) further includes converting at least a portion of the coke deposited onto said coked inorganic material formed in step (b) into syn-gas via a reaction with at least a portion of the reaction products formed during step (b).

14. The process of claim 1, further including directing at least a portion of the reaction products formed in step (b) to a regenerator reactor of a fluid catalytic cracking (FCC) unit configured for processing mineral oil fractions.

15. The process of claim 1, wherein the reaction products include liquid and gaseous reaction products.

16. The process of claim 1, wherein the reaction products include bio-oil.

17. A process for converting biomass to reaction products, said process comprising:

(a) contacting biomass with an inorganic material having catalytic properties, wherein said inorganic material comprises zeolite Y or ZSM-5, wherein said biomass comprises cellulose, hemicellulose, or lignin;

(b) converting said biomass to reaction products in the presence of said inorganic material in a reaction vessel, wherein, during at least a portion of step (b), coke is deposited onto at least a portion of said inorganic material thereby forming a coked inorganic material;

(c) separating at least a portion of said reaction products from said coked inorganic material thereby forming a separated quantity of said reaction products and a separated quantity of said coked inorganic material;

(d) regenerating at least a portion of said separated quantity of said coked inorganic material in a regenerator vessel under conditions sufficient to remove at least a portion of coke from said coked inorganic material thereby producing a regenerated inorganic material; and (e) introducing at least a portion of said regenerated inorganic material into said reaction vessel.

18. The process according to claim 17, further comprising introducing at least a portion of said separated quantity of said reaction products into said regenerator vessel during at least a portion of step (d).

19. The process according to claim 18, further comprising producing syn-gas during at least a portion of step (d).

20. The process according to claim 19, further comprising introducing water and/or $CO_2$ into said regenerator vessel during at least a portion of step (d).

21. The process according to claim 20, wherein said regenerator vessel is an FCC regenerator.

22. The process according to claim 17, wherein said reaction products have a lower molecular weight than said biomass, wherein said reaction products comprise liquid and/or gaseous products.

23. The process according to claim 17, wherein said inorganic material comprises 0.1 to 10 wt. % of a metal or metal compound.

* * * * *